United States Patent
Wu et al.

(10) Patent No.: US 10,000,122 B2
(45) Date of Patent: Jun. 19, 2018

(54) METHOD FOR OPERATING PARALLEL AUXILIARY CONVERTERS IN A RAIL VEHICLE

(71) Applicant: SIEMENS AKTIENGESELLSCHAFT, München (DE)

(72) Inventors: Xiao Qiang Wu, Krefeld (DE); Nikolaj Echkilev, Dormagen (DE); Andreas Wellner, Krefeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days. days.

(21) Appl. No.: 15/300,594

(22) PCT Filed: Mar. 23, 2015

(86) PCT No.: PCT/EP2015/056076
§ 371 (c)(1),
(2) Date: Sep. 29, 2016

(87) PCT Pub. No.: WO2015/150137
PCT Pub. Date: Oct. 8, 2015

(65) Prior Publication Data
US 2017/0207717 A1    Jul. 20, 2017

(30) Foreign Application Priority Data
Mar. 31, 2014  (EP) .................................... 14162768

(51) Int. Cl.
*B60L 1/00* (2006.01)
*B60L 3/00* (2006.01)
(Continued)

(52) U.S. Cl.
CPC ............... *B60L 3/003* (2013.01); *H02H 5/10* (2013.01); *H02J 3/36* (2013.01); *H02M 7/493* (2013.01); *B60L 2200/26* (2013.01); *H02H 3/16* (2013.01)

(58) Field of Classification Search
CPC ............................... H02M 7/06; B60L 3/0023
See application file for complete search history.

(56) References Cited

U.S. PATENT DOCUMENTS 4,608,619 A * 8/1986 Bomer ...................... B60L 3/00
                                                    318/434
6,362,540 B1 * 3/2002 Hill ........................... H02J 1/10
                                                    307/24

(Continued)

FOREIGN PATENT DOCUMENTS

DE         103 01 275 A1    8/2004
DE    10 2008 009512 A1    9/2009
(Continued)

OTHER PUBLICATIONS

English International Search Report issued by the European Patent Office in International Application PCT/EP2015/056076.

*Primary Examiner* — Daniel Cavallari
(74) *Attorney, Agent, or Firm* — Henry M. Feiereisen LLC

(57) ABSTRACT

In a method for supplying an electrical load of a vehicle with electrical energy by auxiliary converters connected in parallel on the alternating-voltage side, a current flow between the auxiliary converters and a grounded N conductor of an energy supply network is interrupted in the presence a ground fault. The auxiliary converters connected in parallel on the alternating-voltage side are operated with fundamental-wave and pulse synchronicity. An energy supply system of a vehicle, in particular of a rail vehicle, performs this method, with the energy supply system including at least (Continued)

two auxiliary converters arranged in parallel, an energy supply network for supplying electrical loads, at least one switch for interrupting a current flow between the auxiliary converters and the energy supply network.

14 Claims, 6 Drawing Sheets

(51) Int. Cl.
*H02M 7/493* (2007.01)
*H02H 5/10* (2006.01)
*H02J 3/36* (2006.01)
*H02H 3/16* (2006.01)

(56) References Cited

U.S. PATENT DOCUMENTS

| | | | |
|---|---|---|---|
| 8,456,128 B2* | 6/2013 | Fotherby | H02M 7/48 318/106 |
| 2006/0255656 A1* | 11/2006 | Linebach | B60L 9/005 303/113.2 |
| 2010/0020576 A1* | 1/2010 | Falk | H02M 7/44 363/55 |
| 2012/0026631 A1* | 2/2012 | Kazemi | H02H 3/16 361/42 |
| 2016/0241153 A1* | 8/2016 | Abeyasekera | H02M 7/493 |

FOREIGN PATENT DOCUMENTS

| | | |
|---|---|---|
| JP | 2012 165509 A | 8/2012 |
| RU | 2462374 C1 | 9/2012 |

\* cited by examiner

METHOD FOR OPERATING PARALLEL AUXILIARY CONVERTERS IN A RAIL VEHICLE

CROSS-REFERENCES TO RELATED APPLICATIONS

This application is the U.S. National Stage of International Application No. PCT/EP2015/056076, filed Mar. 23, 2015, which designated the United States and has been published as International Publication No. WO 2015/150137 and which claims priority of European Patent Application, Serial No. 14162768.7, filed Mar. 31, 2014, pursuant to 35 U.S.C. 119(a)-(b).

BACKGROUND OF THE INVENTION

The invention relates to a method for supplying electrical loads of a vehicle with electrical energy. The invention further relates to an energy supply system of a vehicle, especially of a rail vehicle, for carrying out this method.

An auxiliary converter is used to supply electrical energy to an on-board network of a vehicle and to the loads connected to said network. Typical loads of a vehicle, especially of a rail vehicle, are on-board electronics for controlling/regulating the vehicle, compressors, air conditioning systems, lighting, electrical sockets etc. The loads are subdivided into a group of three-phase loads and a group of single-phase loads.

The three-phase loads are fed via a three-phase energy supply network, such as an alternating current network for example. This energy supply network comprises three phases, which are frequently referred to as L1, L2 and L3. In most cases this three-phase network does not have a neutral conductor (N conductor). However applications are also known in which the three-phase energy supply network is embodied with an N conductor. The N conductor represents the system ground. In rail vehicles in particular the three-phase energy supply network is frequently embodied as a 3AC train power supply line.

With single-phase loads the behavior is different. These are supplied with energy via a phase and a neutral conductor. Thus the single-phase energy supply network does have an N conductor. For reasons of safety this is connected at low impedance to the ground potential.

The task of the auxiliary converter is the feeding of these energy supply networks. Feeding by a number of auxiliary converters switched in parallel is also used for increasing the redundancy and thus for enhancing the fault tolerance of the energy supply.

The components absolutely necessary for the operation of the vehicle are supplied via the three-phase energy supply network. Even if in some cases an additional supply via batteries exists for these components in the event of a failure of the energy supply, the construction of the vehicle aims to design this three-phase energy supply network to be as fail-safe as possible. An especially fail-safe network represents what is known as an IT network. The IT network, also called an IT system, is a type of realization of a network, especially of a low-voltage network for electrical energy supply, with enhanced fault-tolerance in the event of short circuits to ground. In an IT network the protective grounding and the system grounding are embodied differently. The protective grounding is used for shock hazard protection of persons coming into contact with components. The system grounding is implemented by an N conductor. Where the system grounding is present at all in the three-phase energy supply network, this grounding is embodied as isolated, i.e. open. A high-impedance grounding of the N conductor is allowed in such cases. This means that in normal operation this does not result in any low-impedance connection between the phases L1, L2 and L3 of the network and the grounded parts. Thus the IT network does not possess any defined voltage potential in relation to the ground potential and is designated as potential-free. This enables the energy supply network to continue to be operated when there is a short circuit to ground in one of the phases. A warning message usually requires maintenance to be carried out in good time in the event of a detected short circuit to ground, in order to rectify the short circuit to ground. Only a further short circuit to ground in the energy supply network can lead to a failure of the energy supply network. Thus an IT network is suitable to a certain extent for the realization of a fail-safe network of a vehicle.

As well as the three-phase, fail-safe energy supply network there is often the additional requirement, especially in Europe, to operate lower-power loads that do not have such a great requirement for supply security, such as electrical sockets or lamps for example, with just a single phase (e.g. with 230V, 50 Hz). For these loads one or more additional transformers or N conductor creators are needed, which create a single-phase voltage system from the available three-phase energy supply network. This enables the three-phase energy supply network to be embodied as an IT network, i.e. isolated, and the single-phase energy supply network is embodied with grounded N conductors. Above all customers from the Asiatic and American regions often additionally require a loadable N conductor in rail vehicles, to be able to also connect single-phase loads more easily directly to a phase of the three-phase energy supply network. For reasons of safety, defined inter alia in Germany by the standard DIN VDE 0100. The N conductor is permanently grounded on the vehicle side. This type of realization is also referred to as a TT network or TT system.

The additional transformers enable an auxiliary converter to feed an energy supply network of a vehicle, which comprises both an isolated three-phase energy supply network and also a single-phase energy supply network with grounded N conductor. A short circuit to ground in the three-phase energy supply network, because of the galvanic isolation between the three-phase and single-phase energy supply network, does not lead to a failure of these two energy supply networks.

The grounding of the N conductor has the disadvantage that each short circuit to ground in the phase of the single-phase energy supply network leads to short circuit currents in the auxiliary converter. These short circuit currents can be reduced by a suitable design of the transformer, for example a high short circuit voltage $u_k$. In addition, to protect the auxiliary converter in this case, there can be a rapid shut-down of the single-phase energy supply network, in order to protect the semiconductors of the auxiliary converter from damage.

For this reason the components absolutely necessary for the operation of the vehicle are not supplied with electrical energy from the single-phase energy supply network, but from the three-phase energy supply network, in order to make it possible to continue to operate the vehicle.

SUMMARY OF THE INVENTION

The underlying object of the invention is to specify a method for supplying loads of a vehicle with electrical energy, with which the case of a short circuit to ground fault, especially during feeding of the loads with auxiliary converters switched in parallel on the AC voltage side, can be managed safely and also easily and at low cost.

This object is achieved by a method for supply of electrical loads of a vehicle with electrical energy by means of auxiliary converters switched in parallel on the AC voltage side, wherein in the event of short to ground, the flow of current between auxiliary converter and a grounded N conductor of an energy supply network is interrupted, wherein the auxiliary converters switched in parallel on the AC voltage side are operated with frequency and phase position synchronicity.

This object is further achieved by an energy supply system of a vehicle, especially of a rail vehicle, which is intended for carrying out this method and comprises at least two auxiliary converters arranged in parallel, an energy supply network for supply of electrical loads and at least one switch for interrupting a flow of current between auxiliary converter and energy supply network.

The knowledge underlying the invention is that a fault caused by a short circuit to ground does not lead to a failure of the three-phase energy supply network when the flow of current between auxiliary converter and N conductor is interrupted. The interruption of this flow of current enables the auxiliary converter to be operated in isolation. The ground potential is then defined by the short circuit to ground. This corresponds to operation as an IT network. The inventive method makes possible a dynamic switch between energy supply network as TT network with grounded N conductor and an energy supply network as an IT network on occurrence of a short circuit to ground, in order to insure the secure supply of the three-phase energy supply network and of its connected loads. A single-phase energy supply network present is then no longer needed for energy transmission, since through the interruption of the flow of current of the N conductor, energy can no longer be transmitted. Thus with this method a more fail-safe operation of the three-phase energy supply network is guaranteed. This method offers the advantage that, by comparison with previously known methods, it does not require a transformer. This makes the auxiliary converter, in which the transformer is mostly arranged, and also the energy supply network of the vehicle much less expensive and lighter.

The omission of the transformer produces the problem that the auxiliary converters are coupled to one another via the ground connection. In general equalizing currents arise between the parallel-switched auxiliary converters, which make it impossible reliably to supply the loads of the vehicle. It has been shown however that parallel operation of the parallel-switched auxiliary converters is possible if these auxiliary converters are operated with frequency and phase position synchronicity. The advantage of operation with frequency and phase position synchronicity is that equalizing currents between the auxiliary converters are avoided or at least reduced to the extent that a parallel operation of the auxiliary converters is possible. This makes the parallel switching of the auxiliary converters sensible for the first time.

Even if an auxiliary converter fails, the parallel arrangement enables the supply of the electrical loads of the energy supply network to continue to be insured via the auxiliary converters that remain in operation. Through a possible pulse-synchronous clocking of the parallel-switched auxiliary converters an even division of the power to the individual auxiliary converters that are in operation is realized. The advantage of parallel switching is that a number of auxiliary converters, which are of small size and can be easily integrated into the existing installation space, can be provided for the feeding of the electrical loads. A further advantage is that a redundancy is created by the parallel-switched auxiliary converters, so that even in the event of failure of one or more auxiliary converters, the electrical loads or at least a part of the electrical loads, especially the loads absolutely necessary for the operation of the vehicle, can still be supplied reliably with electrical energy.

In a further advantageous form of embodiment the method is intended to insure the operation of the auxiliary converters even in the event of a short circuit to ground in an energy supply network provided for the supply of the electrical loads. A short circuit to ground in an energy supply network is a frequent reason for a failure of the corresponding energy supply network. It is precisely for the case of the short circuit to ground in the energy supply network that the method provides an especially simple option for continuing to maintain the operation of the connected loads without transformers.

In a further advantageous form of embodiment the vehicle involved is a rail vehicle, in which the auxiliary converters switched in parallel on the AC voltage side feed an on-board network of the rail vehicle. It is precisely with rail vehicles that high demands are made on the availability of the vehicle. The failure of a vehicle must be avoided as far as possible because of the dangerous situation of it being left stranded on an open stretch of track, especially dangerously in tunnels and because of the activities then necessary, the expensive recovery. In addition, with stranded rail vehicles there are likely to be significant disruptions in large parts of the rail network. Also customer dissatisfaction because of the delays caused thereby leads to economic losses and must be prevented. In rail vehicles, by contrast for example with rubber-tired vehicles, a grounding is easy to establish. This is generally done by means of a contact via the wheelsets to the rail, which is at ground potential. In this way an N conductor, especially in single-phase energy supply networks, can be realized in a simple and low-cost way. The inventive method is used in order with this arrangement to insure a simple and low-cost operation of the 3AC auxiliary converters switched in parallel on the AC voltage side. This method allows a safe electrical supply of loads that are absolutely necessary for operating the rail vehicle.

In a further advantageous form of embodiment the flow of current is interrupted by opening a switch. The opening of a switch represents a simple option for interrupting the flow of current between 3AC auxiliary converter and energy supply network. In such cases the switch can be connected in the auxiliary converter, in the energy supply network or in a supply line between 3AC auxiliary converter and energy supply network. It has proved especially useful to arrange the switch in the container of the auxiliary converter. Since the information about the short circuit to ground is known to the control/regulator of the auxiliary converter, said device can react quickly to this state when the switch is arranged in the container of the auxiliary converter and is activated by the control/regulator of the auxiliary converter. It is thus possible to protect the 3AC auxiliary converter in an especially simple way.

In a further advantageous form of embodiment, in the method with at least two auxiliary converters, the following steps are carried out when a short circuit to ground is recognized:

Switching off the auxiliary converters,

Opening the switch for interrupting the flow of current between the auxiliary converters and energy supply network, Switching on a first auxiliary converter, Switching on at least one further auxiliary converter, wherein the further auxiliary converter is synchronized during the switching-on process, especially as regards frequency and voltage level, as well as phase position, with the first auxiliary converter, and After freedom from short circuit to ground has been established, the switch to interrupt the flow of current between the auxiliary converters and the energy supply network is closed again.

The occurrence of a short circuit to ground in the energy supply network does not lead to damage to one of the auxiliary converters, which are preferably embodied as 3AC auxiliary converters to enable them to supply energy to at least one 3AC supply network. In addition it is insured that, on occurrence of a short circuit to ground, currents that could lead to damage to a 3AC auxiliary converter, are avoided. The further method steps insure that, on occurrence of a short circuit to ground, an energy supply network, preferably the three-phase energy supply network, can continue to be supplied with energy. To this end a first 3AC auxiliary converter is connected again to the energy supply network in a first step. Parallel-switched further 3AC auxiliary converters synchronize themselves, in relation to the voltage present at their output, with the first 3AC auxiliary converter. The synchronization process is completed when the further 3AC auxiliary converter provides the same output voltage at its output as the first 3AC auxiliary converter, especially in relation to voltage level, frequency and phase position. Then the further 3AC auxiliary converter can also be reconnected to the energy supply network for feeding the electrical loads. This applies to all further 3AC auxiliary converters. This connection of the further auxiliary converters can be done in parallel and/or sequentially. If it is established by suitable means that a short circuit to ground is no longer present, i.e. that there is freedom from short circuits, the flow of current between 3AC auxiliary converter and the energy supply network can be restored. This can for example be achieved by making the electrical connection between 3AC auxiliary converter and N conductor.

In a further advantageous form of embodiment the energy supply system has at least one short circuit to ground monitor. In this case the energy supply network comprises a three-phase energy supply network (3AC) and an N conductor.

This apparatus is suitable for recognizing a short circuit to ground simply and reliably. Through this apparatus the information about a short circuit to ground can be transmitted to a control or regulator of the auxiliary converter with the aid of which the inventive method for operating the 3AC auxiliary converter arranged in parallel is carried out. The advantage is that short circuit to ground monitoring equipment available on the market can be used for this method. It is not necessary to develop a specific device for carrying out the method described above. Thus a low-cost realization of a short circuit to ground monitoring of an energy supply system is guaranteed.

In a further advantageous form of embodiment the auxiliary converters of an energy supply system are arranged electrically in parallel. In this form of embodiment too the auxiliary converters are preferably embodied as 3AC auxiliary converters. Even if an auxiliary converter fails, the parallel arrangement enables the supply of the electrical loads of the energy supply network to continue to be insured via the auxiliary converters that remain in operation. Through a possible pulse-synchronous clocking of the parallel-switched 3AC auxiliary converters an even division of the power to the individual auxiliary converters in operation is realized. The advantage of parallel switching is that a number of 3AC auxiliary converters, which are of small size and can be easily integrated into the existing installation space, can be provided for the feeding of the electrical loads. A further advantage is that a redundancy is created by the parallel-switched 3AC auxiliary converters, so that even in the event of failure or one or more 3AC auxiliary converters, the electrical loads or at least a part of the electrical loads, especially the loads absolutely necessary for the operation of the vehicle, can still be supplied reliably with electrical energy.

In a further advantageous form of embodiment the energy supply system has a three-phase energy supply network and a single-phase energy supply network that are connected galvanically to one another. Through the use of the inventive method galvanic isolation of the single-phase and the three-phase network can be dispensed with. Usually such a galvanic decoupling, also referred to as galvanic isolation, can be insured by a transformer. Since this is no longer required for the inventive energy supply system, said system becomes much less expensive and lighter.

In a further advantageous form of embodiment the galvanic connection between the single-phase energy supply network and the three-phase energy supply network is embodied via the auxiliary converters. The advantage of this arrangement is that flows of current in the event of a short circuit to ground flow via the auxiliary converters and can be recognized by said converters via their control/regulator. The detection makes a simple application of the inventive method possible. This characteristic insures that the operation of the auxiliary converter can still be safely maintained, even if a short circuit to ground is present.

BRIEF DESCRIPTION OF THE DRAWING

The invention is described and explained in greater detail below with reference to the exemplary embodiments shown in the figures, in which.

DETAILED DESCRIPTION OF PREFERRED EMBODIMENTS

Figure 1:
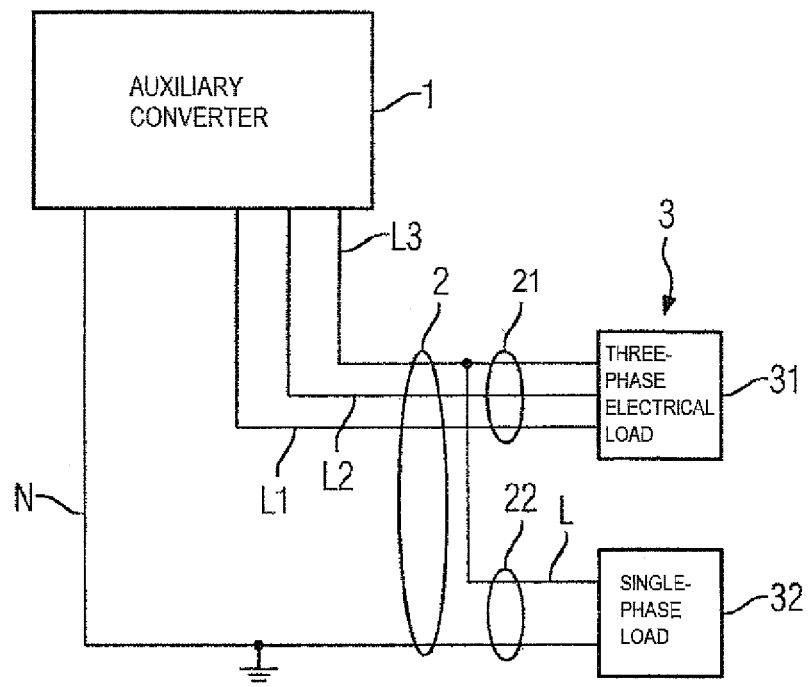
FIG. 1 shows a first basic circuit diagram of an inventive on-board network of a vehicle.

FIG. 1 shows an auxiliary converter 1 that supplies an electrical load 3 with electrical energy. For simplification only one auxiliary converter 1 of the parallel-switched auxiliary converters 1 of the vehicle is shown. In this arrangement a three-phase electrical load 31 is connected to the three-phase energy supply network 21. The single-phase load 32 is connected to the single-phase energy supply network 22. The N conductor N of the single-phase energy supply network 22 is connected to ground potential. In the exemplary embodiment shown here the auxiliary converter 1 makes the three phases L1, L2, L3 available at its outputs to supply the three-phase energy supply network 21. The N conductor N of the single-phase energy supply network 22 forms a further output. The phase L of the single-phase energy supply network is formed by an electrically-conductive connection to the phase L1 of the three-phase energy supply network 21. As an alternative it is also possible to form the phase L of the single-phase energy supply network 22 from the phase L2 or the phase L3 or the three-phase energy supply network 21. The overall energy supply network 2 comprises the three-phase energy supply network 21 and the single-phase energy supply network 22. A vehicle, especially a rail vehicle, has a plurality of electrical loads 3, both three-phase electrical loads 31 and also single-phase electrical loads 32, wherein in the diagram in FIG. 1, for the sake of simplification, only one three-phase electrical load 31 and only one single-phase electrical load 32 respectively are shown.

Figure 2:
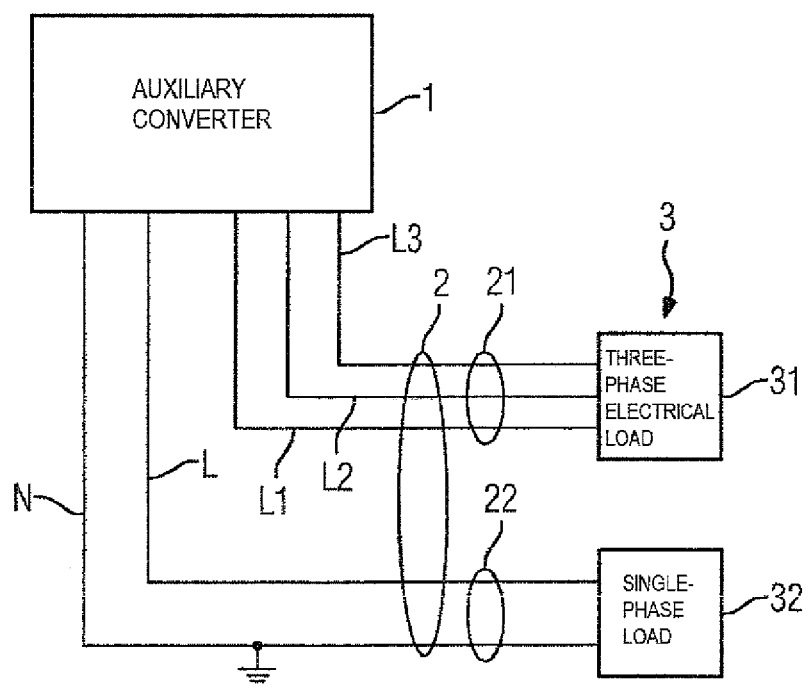
FIG. 2 shows a further basic circuit diagram of an inventive on-board network with a separate single-phase energy supply network.

FIG. 2 shows an alternate embodiment in which the phase L of the single-phase energy supply network 22 is also provided directly at the output of the auxiliary converter 1. In this exemplary embodiment too, for the sake of simplification, only one auxiliary converter 1 of the AC-voltage-side parallel-switched 3AC auxiliary converters 1 of the vehicle is shown. In this case the potential of the phase L can be identical to a potential of the phases L1, L2, L3 of the three-phase energy supply network 21 or can be independent thereof. The advantage of this arrangement lies in the fact that the potential of the phase L of the single-phase energy supply network 22 is created directly in the auxiliary converter 1 and is therefore able to be controlled or regulated by the auxiliary converter 1. The auxiliary converter 1 can create the phase L of the single-phase energy supply network 22 for example by connection to an output that is provided for feeding the three phases L1, L2, L3 of the three-phase energy supply network 21. Also a switching over of the phase L between the phases L1, L2, L3 has proved useful. In addition the flow of current between the single-phase energy supply network 22 and the auxiliary converter 1 can be interrupted easily, e.g. by means of a switch not shown here. To avoid repetitions in relation to matching components of the system, the reader is referred to FIG. 1 and also to the reference characters given in said figure.

Figure 3:
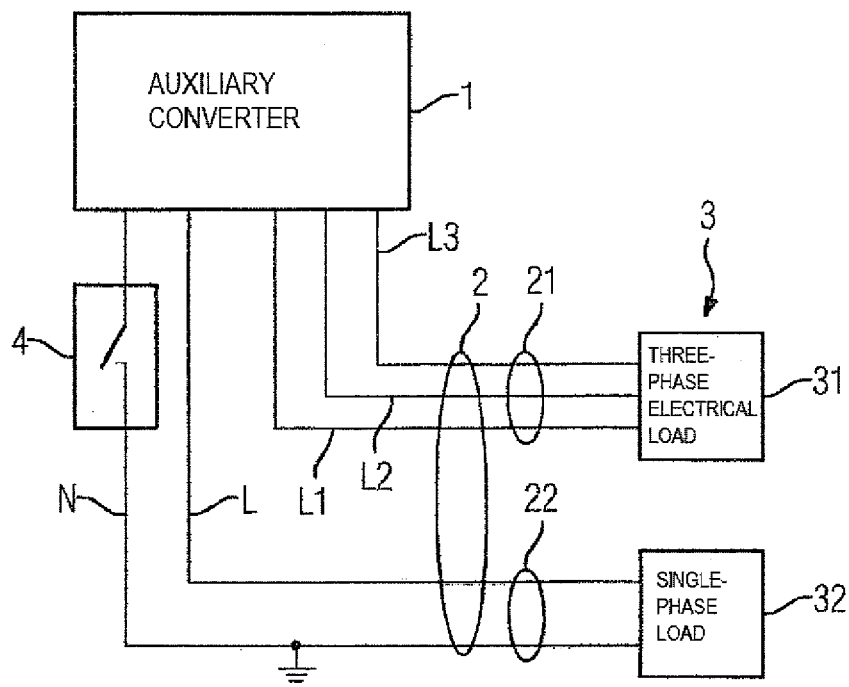
FIG. 3 shows a further basic circuit diagram of an inventive on-board network with a switch.

FIG. 3 shows a further exemplary embodiment of an on-board network of a vehicle in accordance with FIG. 2, wherein a switch 4 to interrupt the flow of current between auxiliary converter 1 and energy supply network 2 is connected between auxiliary converter 1 and the energy supply network 2. To avoid repetitions in relation to matching components of the system the reader is referred to FIG. 1 and FIG. 2 and also to the reference characters given in said figures. In this exemplary embodiment too, for the sake of simplification, only one auxiliary converter 1 of the AC-voltage-side parallel-switched 3AC auxiliary converters 1 of the vehicle is shown. The interruption takes place is this exemplary embodiment with a grounded N conductor N. The N conductor shown here is assigned to the single-phase energy supply network 22. It has additionally proved advantageous for the three-phase energy supply network to have an N conductor. In this case a separate N conductor can be involved or the N conductor of the single-phase energy supply network 22 can be used. Then single-phase loads 32 can be connected between a phase L1, L2, L3 of the three-phase energy supply network 21 and an N conductor. In such cases it has proved especially advantageous also to provide this connection between auxiliary converter 1 and grounded N conductor of the three-phase energy supply network 21 with a switch 4, which interrupts the flow of current between auxiliary converter 1 and N conductor N of the three-phase energy supply network 21. In such cases the switch 4 can be arranged in the supply line between auxiliary converter 1 and energy supply network 2. A useful alternative consists of arranging the switch 4 for interrupting the current between auxiliary converter 1 and energy supply network 2 in the auxiliary converter 1. In this case the switch 4 can then be activated directly by the control/regulator of the auxiliary converter 1.

Figure 4:
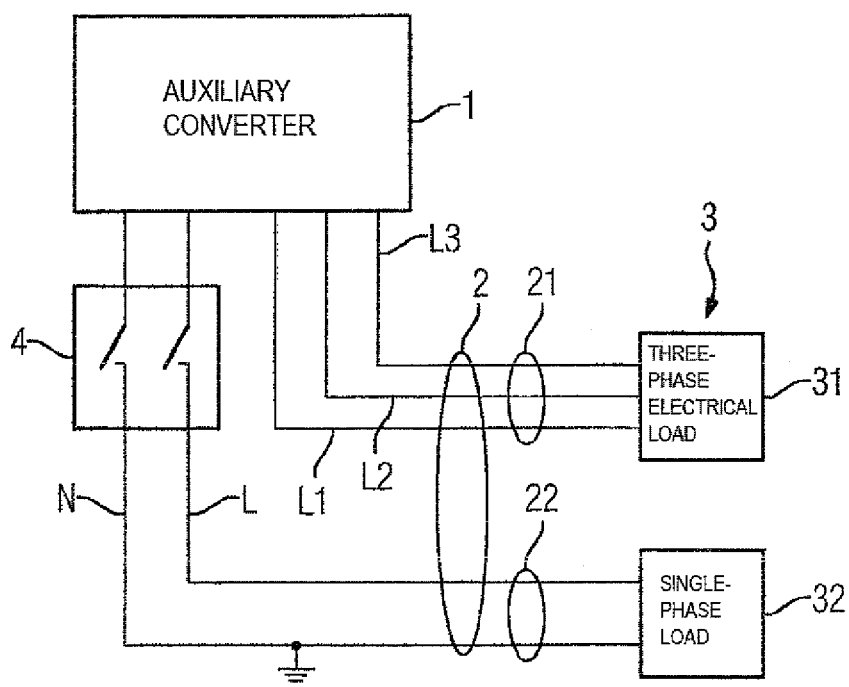
FIG. 4 shows a further basic circuit diagram of an inventive on-board network with a two-pole switch.

FIG. 4 shows a further exemplary embodiment of an on-board network for a vehicle, in which the switch is designed as a two-pole switch. This switch 4 has the task, in the event of a short circuit to ground, as well as interrupting the current between auxiliary converter 1 and N conductor of the energy supply network 2, of also interrupting the phase L of the single-phase energy supply network. This enables it to be insured that, in the case of a short circuit to ground, the single-phase energy supply network 22 is switched to no voltage. The danger for persons, especially for maintenance personnel, of coming into contact with a dangerous voltage, is significantly reduced by this. To avoid repetitions in relation to matching components of the system the reader is referred to FIGS. 1, 2 and 3 and also to the reference characters given in said figures. In this exemplary embodiment too, for the sake of simplification, only one auxiliary converter 1 of the AC-voltage-side parallel-switched 3AC auxiliary converters 1 of the vehicle is shown.

Figure 5:
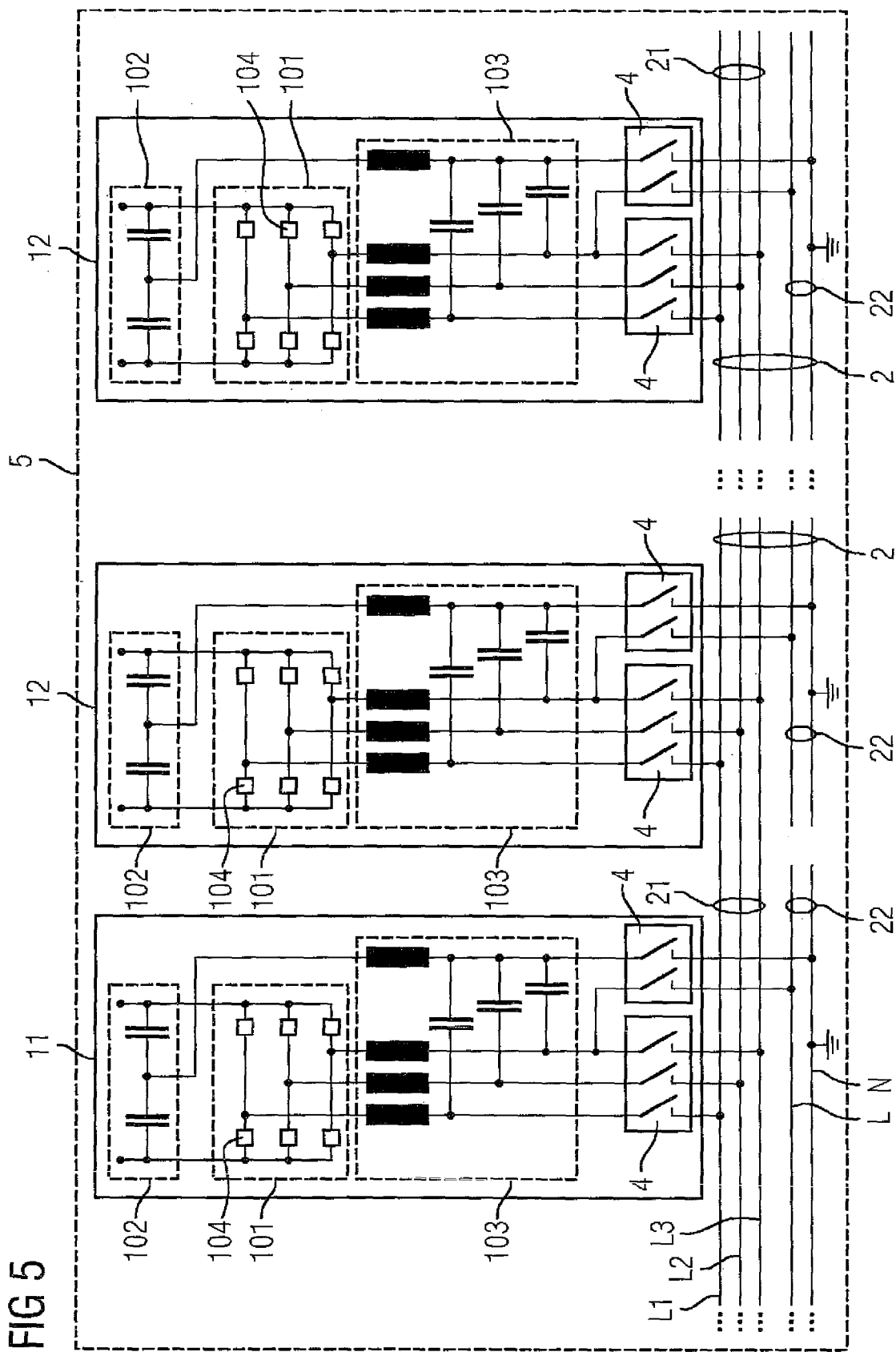
FIGS. 5 to 8 show exemplary embodiments of an energy supply system with auxiliary converters arranged in parallel and a three-phase AC vehicle power supply line.

FIG. 5 shows an exemplary embodiment of an energy supply system with a number of auxiliary converters 11 and 12 arranged in parallel. In this embodiment the parallel-switchable 3AC auxiliary converters simultaneously switch the phase L1, L2, L3 of the three-phase energy supply network 21. This three-phase energy supply network 21 is embodied as a three-phase vehicle power supply line. In addition single-phase energy supply networks 22 also exist, wherein each of these single-phase energy supply networks 22 is fed via an auxiliary converter 11, 12. The parallel switching of the auxiliary converters 11, 12 insures that, even if one or more of the auxiliary converters 11, 12 fails, the three-phase energy supply network 21 is supplied reliably with electrical energy. In order, in the event of a fault in an auxiliary converter 11, 12, to be able to disconnect said converter from the three-phase energy supply network 21, switches 4 are provided in the auxiliary converters 11, 12. These switches 4 make possible an isolation from the energy supply network 2 of the outputs provided for feeding the energy supply network 2. In addition the switches 4 allow the interruption of a flow of current between auxiliary converter and N conductor of the energy supply system 5. This insures that the inventive method is able to be carried out with the aid of the energy supply system 5. The auxiliary converters 11, 12, as well as the switches 4, have a bridge circuit 101 with power semiconductors 104, DC link capacitors 102 and a filter 103. The circuit for obtaining energy from a catenary wire or a diesel generator has been omitted for reasons of clarity. The bridge circuit 101 has power semiconductors 104 that are arranged in a bridge circuit. In this circuit each power semiconductor 104 comprises a semiconductor switch and a diode switched antiparallel thereto. The DC link capacitor 102 serves to smooth the DC link voltage. From this DC link voltage, with the aid of the bridge circuit with power semiconductors 104, a voltage is created at the output of the auxiliary converter 11, 12 with a voltage level that can be regulated and a frequency or phase position that can be regulated. The filter 103 serves to filter out undesired harmonics. With its help it is possible to create a sufficiently accurate sinusoidal curve of the output voltage of the auxiliary converter 11, 12. In the event of a short circuit to ground in the three-phase energy supply network 21 the switches 4 that are connected to the single-phase energy supply network 22 are opened. By this it is insured that the short circuit to ground cannot result in any short circuit currents within the auxiliary converters 11, 12. In addition it is insured that the electrical loads necessary for the operation of the vehicle, especially rail vehicle, can be supplied reliably with energy. A short-duration failure of the three-phase energy supply network 21 does not have any negative effect in this case on the availability of the vehicle. Formulated in another way, even the short-duration failure of the three-phase energy supply network 21 has no effect on the operation of the vehicle.

Figure 6:
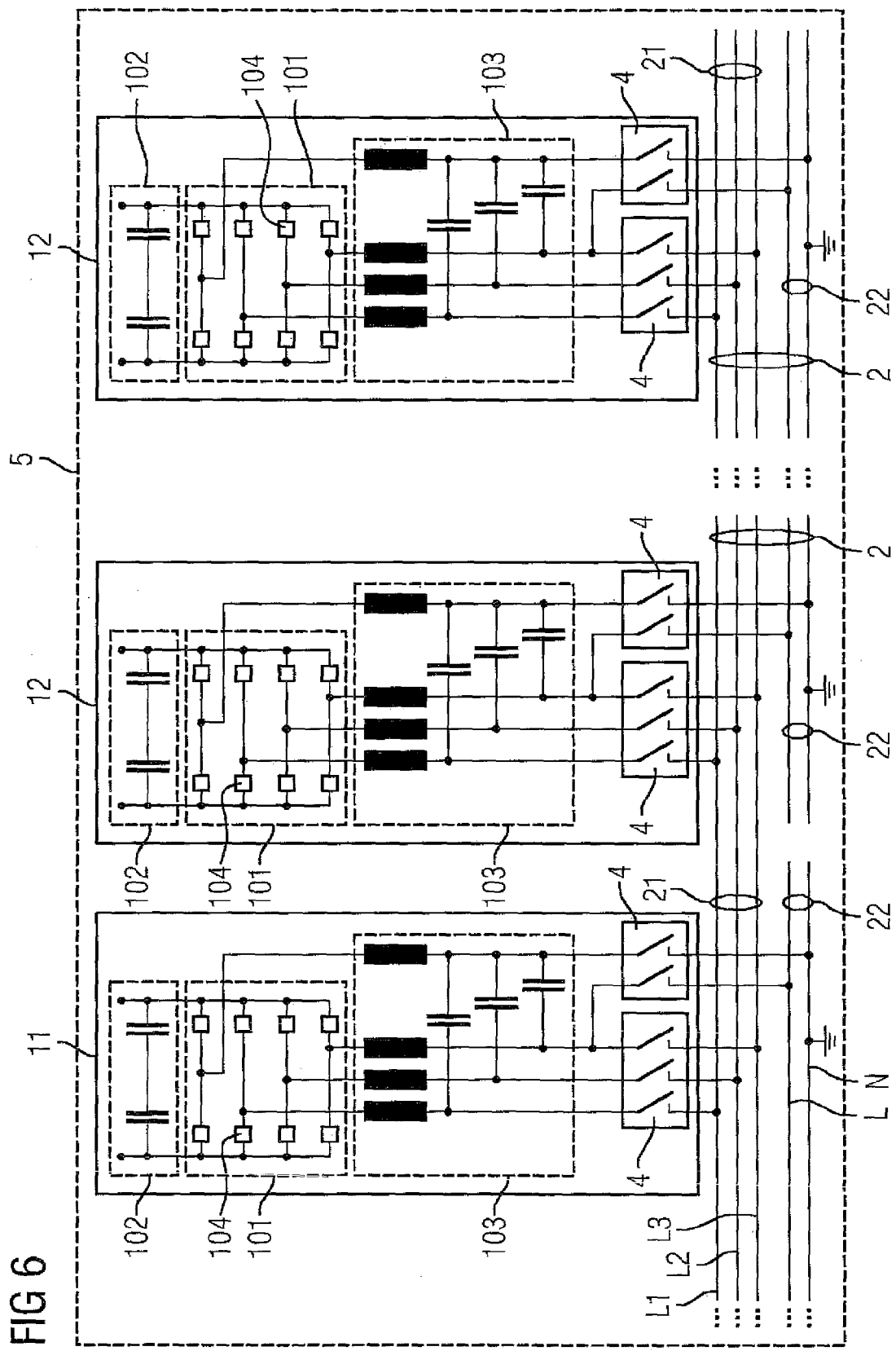

FIG. 6 shows a further exemplary embodiment of an energy supply system 5 for a vehicle. To avoid repetitions in relation to matching components of the system, the reader is referred to FIG. 5 and also to the reference characters given therein. This exemplary embodiment shown in FIG. 6 differs from that of FIG. 5 by the bridge circuit 101 with power semiconductors 104 within the auxiliary converter 11, 12. In this figure the output of the auxiliary converter 11, 12, which is used for connection to the N conductor of the energy supply network 2, is not connected to the mid point of the DC link capacitors 102 connected in series but to a further bridge branch of a bridge circuit 101 with power semiconductors 104. With this circuit it is possible to create a voltage at the output of the auxiliary converter 1 that has fewer harmonics. This arrangement allows the filter 103 to be constructed smaller and at lower cost. At the same time the quality of the output voltage of the auxiliary converter 1 is further enhanced. This is shown by the voltage at the output corresponding to a sinusoidal shape.

Figure 7:
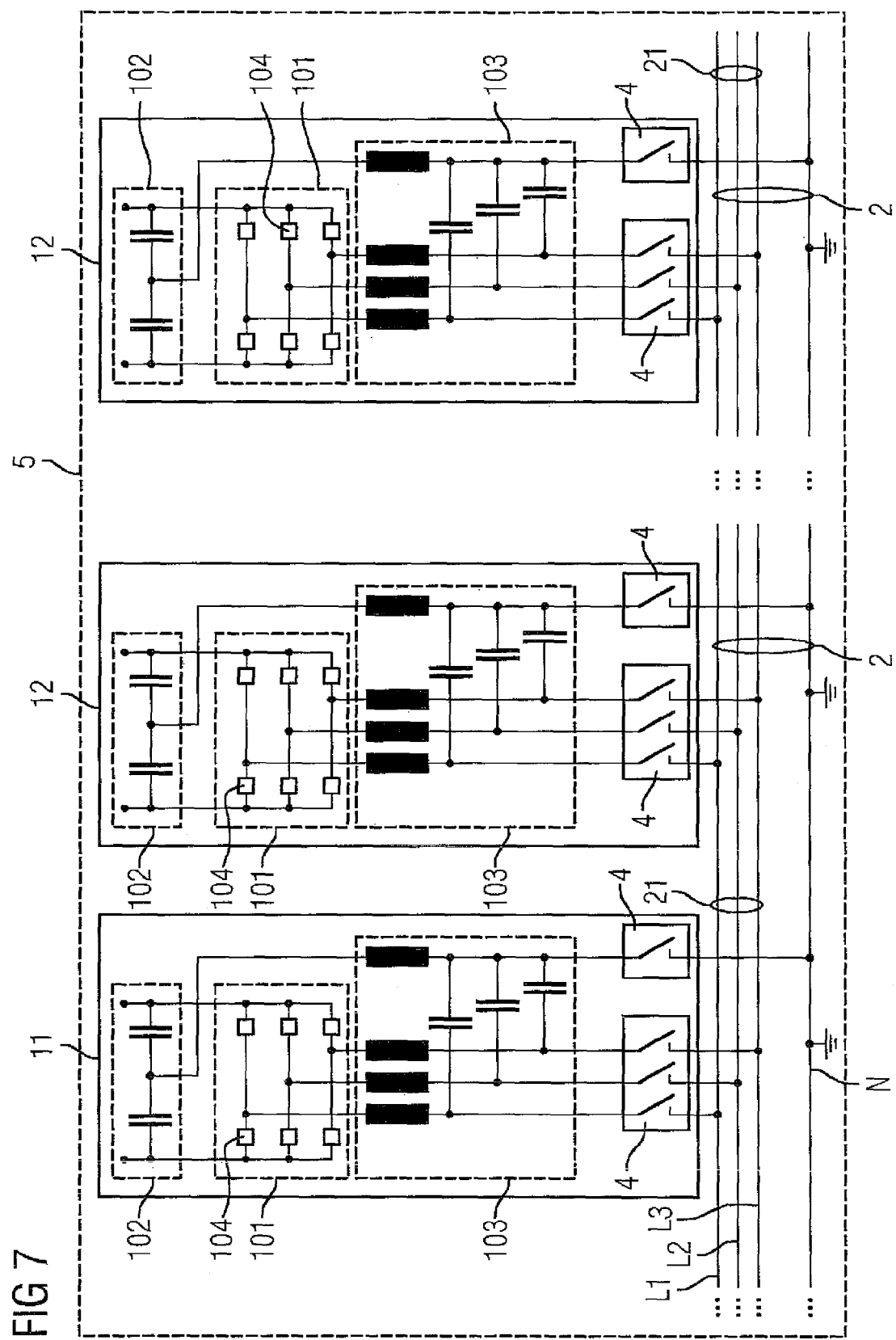

FIG. 7 shows a further exemplary embodiment of an inventive energy supply system 5. To avoid repetitions in relation to matching components of the system, the reader is referred to FIGS. 5 and 6 and also to the reference characters given therein. This exemplary embodiment dispenses with a single-phase energy supply network 22. A three-phase energy supply network 21, which is embodied as a three-phase vehicle supply line, is fed from the auxiliary converters 11, 12. In addition a grounded N conductor is connected to the auxiliary converter 11, 12. By the omission of the single-phase energy supply network, this energy supply system 5 can be manufactured at lower cost. In this energy supply system 5 single-phase loads 32, which are not shown in this figure for the sake of clarity, are connected to one of the phases L1, L2 and L3 the three-phase energy supply network 21 and the N conductor N. In the event of a short circuit to ground the flow of current between auxiliary converter 11, 12 and N conductor N is interrupted. This is done via the switch 4, which is arranged at the output of the auxiliary converter 11, 12 and establishes the connected to the N conductor. It has proved advantageous if, for this configuration, the single-phase loads 22 are safeguarded by a protection facility such that, on interruption of the flow of current between N conductor and auxiliary converter 1, the corresponding voltage-carrying phase is isolated from the single-phase load.

Figure 8:
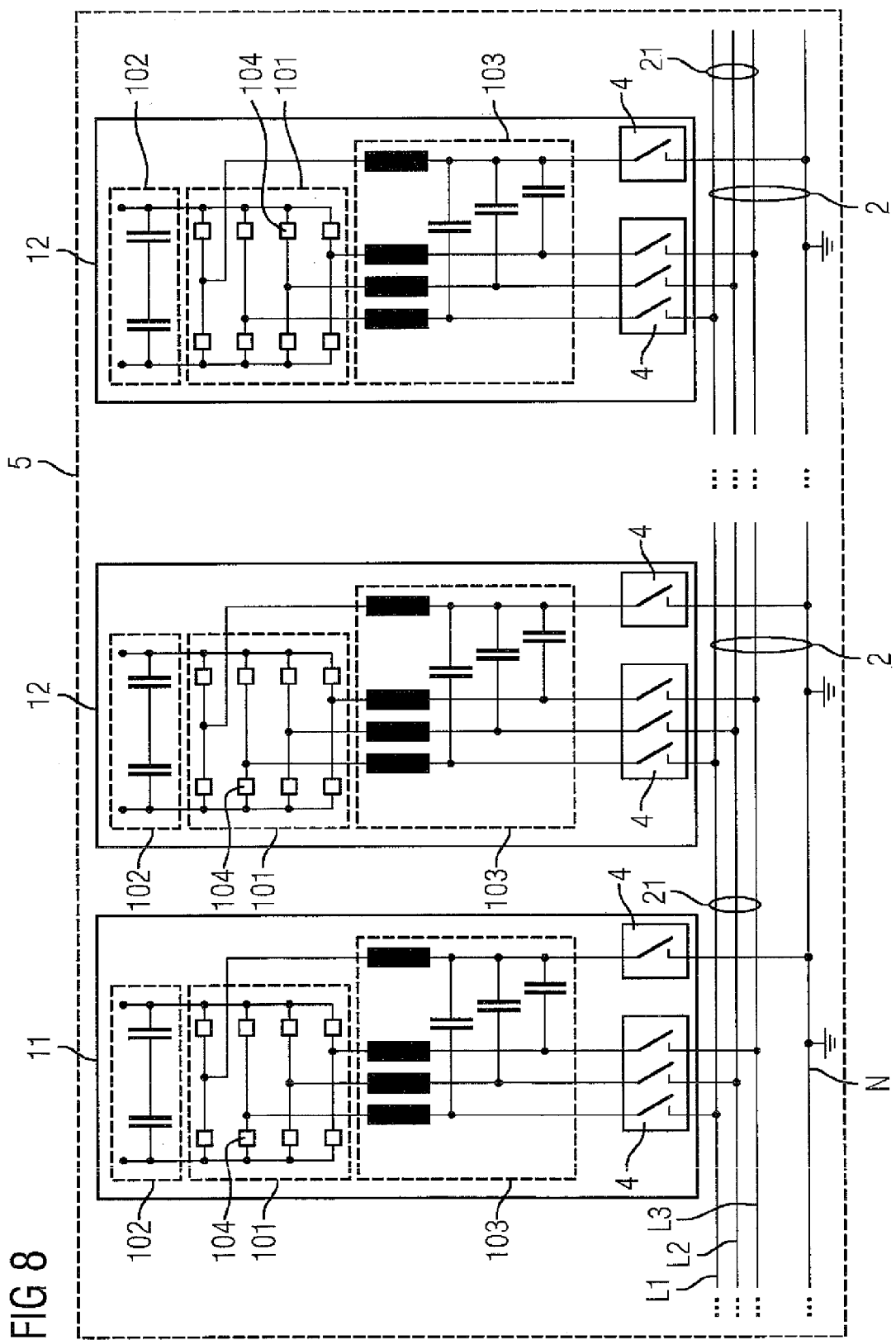

FIG. 8 shows a further exemplary embodiment of an energy supply system 5. This essentially corresponds to the form of embodiment in accordance with FIG. 7, however the output of the auxiliary converter 11, 12, which is provided for a connection to the N conductor, is connected electrically-conductively to the fourth phase of a bridge circuit 101 with power semiconductors 104. To avoid repetitions in relation to matching components of the system, the reader is referred to FIGS. 5 to 7 and also to the reference characters given therein. By contrast with the exemplary embodiment according to FIG. 7, in which this output is connected within the auxiliary converter 11, 12 to two DC link capacitors 102 switched in series, the quality of the voltage at the outputs of the auxiliary converter 11, 12, which are provided for connection to the phases L1, L2 and L3 of the three-phase energy supply network 21 can be further enhanced by the bridge circuit 101 with power semiconductors 104 being expanded by a bridge branch, to which the connection to the N conductor N is connected. This means that the deviation of these voltages from an ideal sinusoidal shape is smaller. This makes it possible to embody the filter 103 of the auxiliary converter 11, 12 more simply and thereby lighter and at lower cost. With this arrangement too single-phase loads 32 are supplied from one of the phases L1, L2 or L3 of the three-phase energy supply network 21 and from the N conductor. To insure correct operation, to safeguard the protection of personnel and to protect the connected single-phase loads, it has proved advantageous if, on interruption of the flow of current between the N conductor of the energy supply network 2 and the auxiliary converter 11, 12, the connection between the phase that is responsible for the supply of the single-phase load 32 and the single-phase load 32 is interrupted.

Although the invention has been illustrated and described in greater detail by the preferred exemplary embodiments, the invention is not restricted solely to the disclosed examples and other variations can be derived herefrom by the person skilled in the art, without departing from the scope of protection of the invention.

What is claimed is:

1. A method of supplying an electrical load in an on-board energy supply network of a vehicle with electrical energy, said energy supply network having at least two auxiliary converters, said auxiliary converters configured to be switched in parallel on an AC voltage side and to feed the energy supply network of the vehicle, comprising the steps of:
   interrupting a connection between a grounded N conductor of the energy supply network and the auxiliary converters in the event of a short circuit to ground; and
   operating the auxiliary converters with phase position and frequency synchronicity by switching the auxiliary converters in parallel.

2. The method of claim 1, wherein the short circuit to ground occurs in the energy supply network.

3. The method of claim 1, wherein the vehicle is a rail vehicle.

4. The method of claim 1, wherein the connection between a grounded N conductor of the energy supply network and respective auxiliary converters is interrupted by opening respective switches.

5. The method of claim 1, wherein the auxiliary converters are operated with phase position, frequency and voltage level synchronicity.

6. A method of supplying an electrical load in an on-board energy supply network of a rail vehicle With electrical energy, said energy supply network having a grounded N conductor and at least two auxiliary converters that are switched in parallel on an AC voltage side, comprising the steps of:
   switching off the auxiliary converters in the event of a short circuit to ground;
   interrupting a connection between the switched-off auxiliary converters and the energy supply network by opening at least one respective switch;
   switching on one of the switched-off auxiliary converters;

synchronizing the phase position and frequency of the converter that is switched-on while switching on a further auxiliary converter that was switched off; and closing the at least one switch that interrupted the connection between the auxiliary converters and the energy supply network, once absence of the short circuit to ground has been established, thereby operating the auxiliary converters with phase position and frequency synchronicity.

7. The method of claim 6, wherein the further auxiliary converter is synchronized with respect to phase position, frequency and voltage level.

8. An on-board energy supply system of a vehicle, comprising:
at least two auxiliary converters configured to be switched in parallel on an AC voltage side and to be synchronous in phase position and frequency;
an energy supply network configured to supply an electrical load with electrical energy and having a grounded N conductor that is connected to the converters; and
a switch configured to interrupt a connection between the grounded N conductor and the auxiliary converters of the energy supply network.

9. The energy supply system of claim 8, configured to supply energy in a rail vehicle.

10. The energy supply system of claim 8, further comprising at least one short circuit to ground monitoring facility.

11. The energy supply system of claim 8, wherein each auxiliary converter is connected in parallel with others and includes a switch configured to switch the auxiliary converter on an AC voltage side of the auxiliary converter.

12. The energy supply system of claim 8, wherein the energy supply system has a three-phase energy supply network and a single-phase energy supply network that are electrically connected to one another.

13. The energy supply system of claim 12, wherein the electrical connection between the three-phase energy supply network and the single-phase energy supply network is implemented by an auxiliary converter.

14. The energy supply system of claim 8, wherein the auxiliary converters are configured to be synchronous in phase position, frequency and voltage level.

* * * * *